W. C. PECK.
VEHICLE TIRE.
APPLICATION FILED JAN. 24, 1921.

1,416,303.

Patented May 16, 1922.

INVENTOR
Waldemar C. Peck
BY
A. M. Wooster
ATTORNEY

UNITED STATES PATENT OFFICE.

WALDEMAR C. PECK, OF NAUGATUCK, CONNECTICUT.

VEHICLE TIRE.

1,416,303.  Specification of Letters Patent.  Patented May 16, 1922.

Application filed January 24, 1921. Serial No. 439,401.

*To all whom it may concern:*

Be it known that I, WALDEMAR C. PECK, a citizen of the United States, residing at Naugatuck, county of New Haven, State of Connecticut, have invented an Improvement in Vehicle Tires, of which the following is a specification.

This invention relates to vehicle tires and more particularly to those used on automobiles and trucks, and has for its principal object the production of a semi-solid vehicle tire which has all of the resiliency and other advantages of a pneumatic tire and also has the durability of a solid tire.

An object of the invention is to produce a semi-solid tire having the appearance of a pneumatic tire, in which are located a plurality of cushion chambers. The cushion chambers are preferably formed at a closer proximity to the inner periphery of the tire than to the tread or outer periphery, thus providing a substantial wearing surface at the tread portion, and are interconnected by relatively narrow passages between adjacent chambers, which allow the air in the tire to circulate. I also provide a small vent or vents leading outwardly from the cushion chambers to the outside of the tire, through which the air is exhausted and fresh air is admitted.

The improved tire provided by my invention is very resilient, and is well ventilated to eliminate the heating of the tire caused by the friction of the tire on the road bed. The cushion chambers disclosed herein act similarly to a plurality of bellows and cause cool, fresh air to be constantly circulated through the tire.

The above and other objects of the invention will more fully appear from the following description and drawing and will be especially pointed out in the appended claims.

Figure 1:
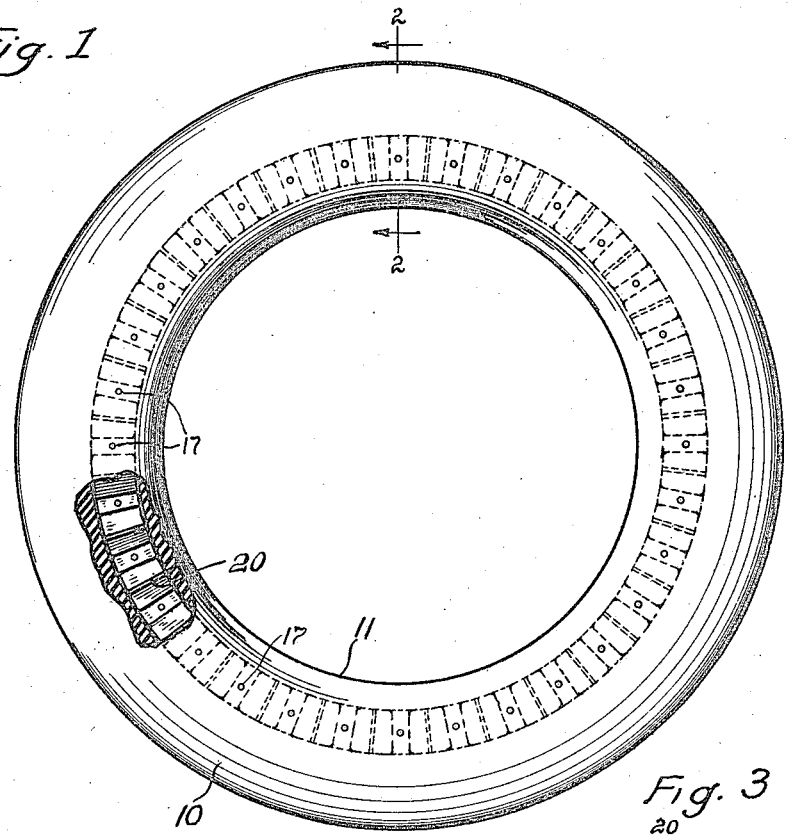
Figure 2:
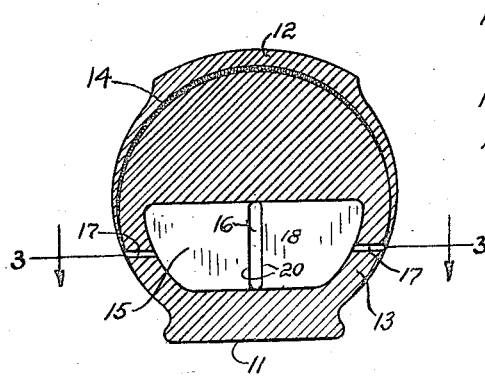
Figure 3:
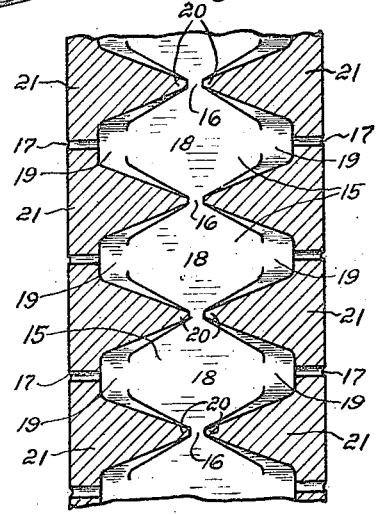

Fig. 1 is a side elevation of my novel vehicle tire a portion thereof being in longitudinal section:

Fig. 2, a transverse sectional view on an enlarged scale taken through one of the cushion chambers: and Fig. 3 is an enlarged longitudinal sectional view taken through the cushion chambers on the line 3—3 in Fig. 2, looking in the direction of the arrows.

My novel vehicle tire, as illustrated in the drawing, is shaped after the well known clencher type tire, but the invention is not intended to be restricted thereto. 10 denotes the tire in general, 11 the inner periphery of the tire upon which is mounted the usual metallic rim, not shown, and 12 denotes the outer circumference or tread strip of the tire. In building the tire the major portion at the inner edge, indicated by 13, may be tubed or molded from solid rubber. Upon this portion is wrapped a strip of fabric 14, commonly known as the breaker strip, and on top of the breaker strip is placed the tread strip 12, which may be either plain or formed with a non-skid design. The foregoing description relating to the construction of a tire is only one of the many ways of forming a tire, and has been given for clearness of understanding alone.

Located internally of the portion 13 is a plurality of air pockets or cushion chambers 15, the chambers being located nearer to the inner periphery than to the tread portion of the tire to afford a substantial cross section of material adjacent the tread for wearing purpose. It is necessary to provide a sufficiently rigid tread portion in the tire to obtain the desired resiliency, and it will be apparent that if the wall of material between the cushion chambers and the tread was insufficient in thickness, the pressure exerted on the tread of the tire would cause the cushion chambers to become completely depressed or deflated, and the function of the cushion chambers would be lost. The cushion chambers are spaced equidistant around the tire and are interconnected together by relatively narrow passages 16, shown in the drawing as being centrally located between the chambers, and it will be seen that as the tire is compressed at the point of one of the various cushion chambers the air contained therein will flow from that chamber into the others.

As shown in the drawing the passages 16 extend substantially radially of the tire and wheel, that is, substantially normal to the tread of the tire. To aid in the ventilation of the tire the cushion chambers are provided with a small vent or vents 17, which extend outwardly from the chambers through the sides of the tire. In rotation of the tire over the road bed the cushion chambers are intermittently compressed and part of the air in the chambers is expelled from the tire, the chambers acting as bellows and sucking in a fresh supply of air when they expand back to their original shape. The constant changing of air in the cushion chambers tends to keep the tire well ventilated and to prevent the tire from heating, due to the friction and centrifugal movement of the tire over the road bed.

While the specific shape of the cushion chambers is non-essential, it is found practicable to construct the cushion chambers of an oblong shape extending transversely of the tire, having a relatively large central portion 18 and reduced end portions 19. As will be seen from an inspection of Fig. 3, the partitions of the tire between the cushion chambers are tapered inwardly, the wedge shaped portion 20 of each side of the partitions terminating short of the center to provide the narrow passage 16, and the outer portion 21 of the partitions between the ends of the chambers being of a substantial width to afford sufficient strength to the sides of the tire. With this construction I provide a semi-solid vehicle tire with a plurality of comparatively large centrally located air cushion chambers, thus rendering the tire very resilient, and yet retain enough material at the sides of the tire and between the cushion chambers to provide a practicable tire.

It is obvious that various changes and modifications may be made in the construction of my novel vehicle tire without departing from the spirit of the invention as defined in the scope of the following claims:

1. A semi-solid vehicle tire having a plurality of cushion chambers circumferentially located adjacent the inner periphery of the tire, said chambers being connected by relatively narrow substantially radially extending passages and provided with vents extending through the sides of the tire.

2. A semi-solid vehicle tire having a plurality of oblong cushion chambers located adjacent the inner periphery and transversely of the tire, said cushion chambers being connected by relatively narrow substantially radially extending passages.

3. A semi-solid vehicle tire having a plurality of cushion chambers located adjacent the inner periphery of the tire, said chambers being oblong in shape, their sides converging toward their extremes, and said chambers being connected by relatively narrow passages.

4. A semi-solid vehicle tire having a plurality of oblong cushion chambers extending transversely of the tire and symmetrical on opposite sides of the center of the tire, said cushion chambers being connected by relatively narrow substantially radially extending passages.

5. A semi-solid vehicle tire having a plurality of oblong cushion chambers extending transversely of the tire and symmetrical on opposite side of the center of the tire, said cushion chambers being connected by relatively narrow substantially radially extending passages and provided with vents extending through the sides of the tire.

6. A semi-solid vehicle tire having a plurality of cushion chambers extending transversely of the tire, said chambers being oblong in shape, with their sides converging toward their extremes, said chambers also being connected by relatively narrow passages and provided with vents extending through the sides of the tire.

7. A semi-solid vehicle tire having a plurality of cushion chambers extending transversely of the tire, said chambers being oblong in shape with their sides converging toward their extremes to provide inwardly tapered dividing walls between the chambers.

8. A semi-solid vehicle tire having a plurality of cushion chambers extending transversely of the tire, said chambers being oblong in shape with their sides converging toward their extremes to provide inwardly tapered dividing walls between the chambers, and the inner extremities of opposed dividing walls being spaced from each other to provide relatively narrow passages connecting adjacent chambers.

9. A semi-solid vehicle tire having a plurality of cushion chambers extending transversely of the tire, said chambers being oblong in shape with their sides converging toward their extremes to provide inwardly tapered dividing walls between the chambers, and the extremes of said chambers being provided with vents extending through the sides of the tire.

10. A semi-solid vehicle tire having a plurality of cushion chambers extending transversely of the tire, said chambers being oblong in shape with their sides converging toward their extremes to provide inwardly tapered dividing walls between the chambers, the extremes of said chambers being provided with vents extending through the sides of the tire, and the inner extremities of opposed dividing walls being spaced from each other to provide relatively narrow passages connecting adjacent chambers.

In testimony whereof I affix my signature.

WALDEMAR C. PECK.